United States Patent
Patil et al.

(10) Patent No.: US 10,904,322 B2
(45) Date of Patent: Jan. 26, 2021

(54) SYSTEMS AND METHODS FOR SCALING DOWN CLOUD-BASED SERVERS HANDLING SECURE CONNECTIONS

(71) Applicant: Cisco Technology, Inc., San Jose, CA (US)

(72) Inventors: Santosh Ramrao Patil, Santa Clara, CA (US); Swaminathan Anantha, Mountain View, CA (US); Sourav Chakraborty, Fremont, CA (US); Shyam Sundar Vaidyanathan, Milpitas, CA (US); Gangadharan Byju Pularikkal, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 68 days.

(21) Appl. No.: 16/009,485

(22) Filed: Jun. 15, 2018

(65) Prior Publication Data
US 2019/0387049 A1    Dec. 19, 2019

(51) Int. Cl.
*H04L 29/08* (2006.01)
*H04L 12/26* (2006.01)
*H04L 12/66* (2006.01)

(52) U.S. Cl.
CPC .......... *H04L 67/1002* (2013.01); *H04L 12/66* (2013.01); *H04L 43/08* (2013.01)

(58) Field of Classification Search
CPC ...... H04L 67/1002; H04L 12/66; H04L 43/08
See application file for complete search history.

(56) References Cited

U.S. PATENT DOCUMENTS

| 5,812,773 A | 9/1998 | Norin |
| 5,889,896 A | 3/1999 | Meshinsky et al. |

(Continued)

FOREIGN PATENT DOCUMENTS

| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Ranodhi Serrao
*Assistant Examiner* — Raqiul A Choudhury
(74) *Attorney, Agent, or Firm* — Polsinelli PC

(57) ABSTRACT

The disclosed technology relates to systems and methods for automatically scaling down network resources, such as servers or gateway instances, based on predetermined thresholds. A system is configured to detect a reduction in one or more network metrics related to a first server, and instruct the first server to issue a rekey request to a plurality of devices connected to the first server. The system is further configured to instruct a load balancer to route to at least one other server responses from the plurality of devices to the rekey request, and determine a number of connections remaining between the first server and the plurality of devices. The system may be further configured to instruct the load balancer to terminate the first server based on the detected number of connections remaining between the first server and the plurality of devices.

17 Claims, 4 Drawing Sheets

(56) References Cited

U.S. PATENT DOCUMENTS

| | | | |
|---|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 7,926,098 B2 | 4/2011 | Chinitz et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,104,081 B2 | 1/2012 | Khanna et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 8,984,114 B2 | 3/2015 | Shieh et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 10,419,447 B2 * | 9/2019 | Chao ................. G06F 13/24 |
| 2001/0055303 A1 | 12/2001 | Horton et al. |
| 2002/0073337 A1 | 6/2002 | Ioele et al. |
| 2002/0120743 A1 * | 8/2002 | Shabtay ............ H04L 67/1008 709/226 |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |

(56) References Cited

U.S. PATENT DOCUMENTS

| | | |
|---|---|---|
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318605 A1* | 12/2010 | Weis .............. G06F 11/2028 709/203 |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0096269 A1 | 4/2012 | McAlister |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1* | 10/2013 | Chang .................. H04L 49/70 726/12 |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |

(56) References Cited

U.S. PATENT DOCUMENTS

| | | |
|---|---|---|
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorensen, III et al. |
| 2014/0310417 A1 | 10/2014 | Sorensen, III et al. |
| 2014/0310418 A1 | 10/2014 | Sorensen, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0100826 A1* | 4/2015 | Vujic ............... G06F 9/5083 714/37 |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1* | 7/2015 | van Bemmel ...... H04L 67/1008 709/226 |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373048 A1* | 12/2015 | Siddiqui ............... H04L 67/125 713/151 |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0021698 A1 | 1/2016 | Zhao et al. |
| 2016/0026684 A1 | 1/2016 | Mukherjee et al. |
| 2016/0062786 A1 | 3/2016 | Meng et al. |
| 2016/0080259 A1* | 3/2016 | Biancaniello ....... H04L 67/1002 709/203 |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0141916 A1* | 5/2017 | Zhang ................ H04L 9/0891 |
| 2017/0147297 A1 | 5/2017 | Krishnamurthy et al. |
| 2017/0149810 A1* | 5/2017 | Keshet ............... H04L 63/1425 |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |
| 2019/0026234 A1* | 1/2019 | Harnik ............... G06F 21/6209 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

(56) References Cited

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, Cisco Systems, Jan. 2012, 12 pages.
Ford, Bryan, et al., Peer-to-Peer Communication Across Network Address Translators, in USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 18 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH"Service Function Chaining Internet Draft, draft-kumar-sfc-nsh-forwarding-00, Dec. 5, 2015, 17 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology" http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Workgroup Internet Draft, draft-snr-bess-evpn-proxy-arp-nd-02, Oct. 6, 2015, 22 pages.

(56) References Cited

OTHER PUBLICATIONS

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Ye, Xianglong, et al., "A Novel Blocks Placement Strategy for Hadoop," 2012 IEEE/ACTS 11$^{th}$ International Conference on Computer and Information Science, 2012 IEEE, 5 pages.

\* cited by examiner

SYSTEMS AND METHODS FOR SCALING DOWN CLOUD-BASED SERVERS HANDLING SECURE CONNECTIONS

TECHNICAL FIELD

This present disclosure relates in general to the field of computer networks, and more specifically to systems and methods for scaling down cloud-based servers handling secure connections.

BACKGROUND

In a cloud-managed network or cloud-based system, such as an enterprise private network or a data center network, devices such as endpoint machines, access points, routers, switches, servers, firewalls, gateways, other computing devices, virtual machines, containers (an instance of container-based virtualization), or resources (e.g., applications, endpoint groups, etc.) may connect to the cloud-based system over a secure connection, such as by a TLS, DTLS or IPSEC connection.

Cloud-based systems may utilize a virtual machine to serve as a scalable security gateway to manage secure connections between devices and cloud-based servers. Additional instances of the security gateway (e.g., TLS GW, IPSEC GW) may be spun up based on increased network traffic. Cloud-based systems, however, may not be capable of scaling down network resources due to the presence of secure connections that prevent termination of a network resource (e.g., security gateway instance or server) without disconnecting from connected devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
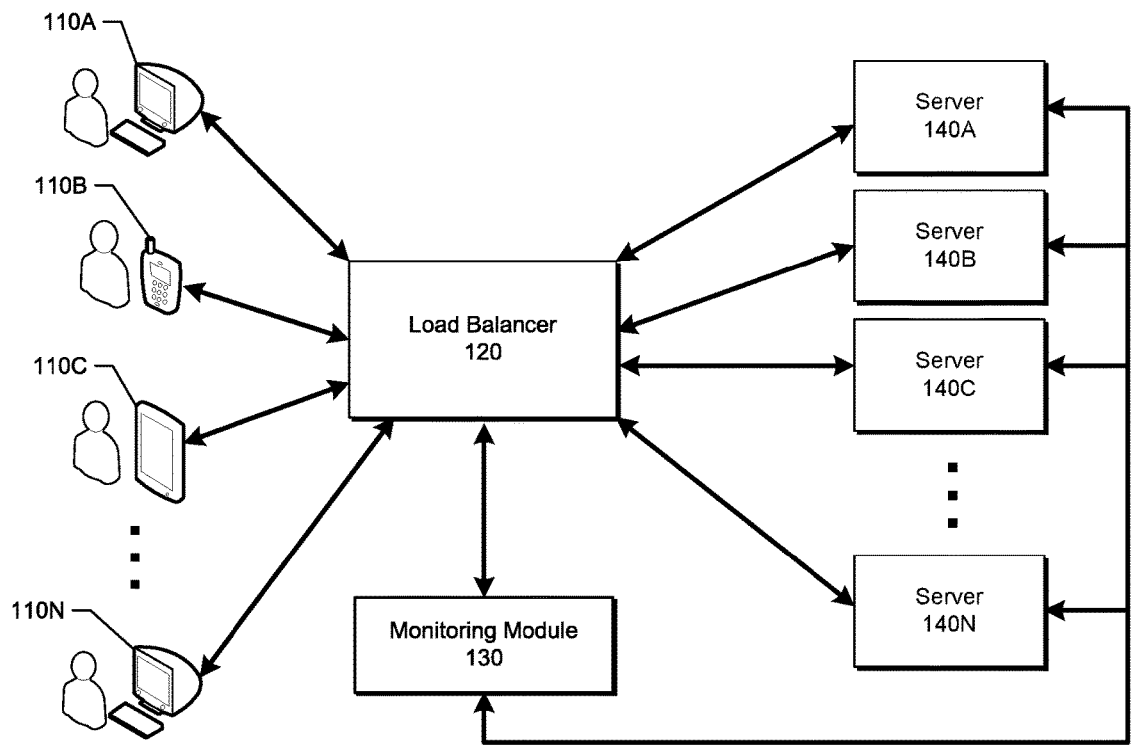
FIG. 1 is a conceptual block diagram illustrating an example network environment, in accordance with various aspects of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

A cloud-managed network or cloud-based system may utilize secure connection protocols, such as by Transport Layer Security (TLS), Datagram Transport Layer Security (DTLS) or Internet Protocol Security (IPSEC), to connect devices to gateways (GW) or servers. Cloud-based systems may utilize a virtual machine or container to serve as a scalable security gateway to manage secure connections or tunnels between devices and GW instances. Additional GW instances (e.g., TLS GW, IPSEC GW) may be spun up based on increased network traffic.

During non-peak network traffic periods, connections to minimally loaded GW instances cannot be terminated without affecting secure tunnel sessions between the GW instance and connected devices. For example, if a single tunnel remains active on a minimally loaded GW instance, then the minimally loaded GW instance remains active until such time the connection is terminated by the connected device. In particular, where a tunnel is running over a TCP connection, the connection to the minimally loaded GW instance cannot be transitioned to another GW instance without disconnecting or otherwise negatively affecting the tunnel.

In addition, conventional hardware, such as on-premises data gateways, cannot be utilized to scale down GW instances in a cloud-based system because GW instances in a cloud-based system may be located in different clusters, regions, or data centers. Further, scaling down network resources using conventional on-premises data gateways require a central backup of a state of a connection, as well as information about the connection, and thereby require additional overhead.

Accordingly, there is a need in the art for certain embodiments of an intelligent and dynamically down-scalable cloud-based system to address these and/or other issues. Aspects of the subject technology relate to systems and methods for automatically scaling down network resources, such as servers or security GW instances, based on predetermined thresholds, without negatively affecting connectivity. Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

FIG. 1 illustrates a conceptual block diagram illustrating an example network environment 100, in accordance with various aspects of the subject technology. Various aspects are discussed with respect to a general wide area network for illustrative purposes, however, these aspects and others may be applied to other types of networks. For example, the network environment 100 may be implemented by any type of network and may include, for example, any one or more of an enterprise private network (EPN), cellular network, a satellite network, a personal area network (PAN), a local area network (LAN), a broadband network (BBN), the Internet, and the like. The network can be a public network, a private network, or a combination thereof. The network environment 100 may be implemented using any number of communications links associated with one or more service providers, including one or more wired communication links, one or more wireless communication links, or any combination thereof. Additionally, the network environment 100 can be configured to support the transmission of data formatted using any number of protocols (e.g., TLS, DTLS, IPSEC).

The network environment 100 may comprise a cloud-managed network or cloud-based system that includes one or more devices 110A-N. A device 110A-N may include machines (e.g., servers, personal computers, laptops), virtual machines, containers, mobile devices (e.g., tablets or smart phones), smart devices (e.g., set top boxes, smart appliances, smart televisions, internet-of-things devices), or network equipment, servers, containers, among other computing devices.

Each device 110A-N is configured to communicate with one or more servers 140A-N via a load balancer 120. For example, devices 110A-N may utilize software applications, browsers, or computer programs that are running on a device such as a desktop computer, laptop computer, tablet computer, server computer, smartphone, or any other apparatus on which an application (e.g., client application) is running that at some point in time, involves a user accessing a service or data provided by the server 140A-N. Devices 110A-N may operate pursuant to the TLS, DTLS, or IPSEC protocol to control how data (e.g., packets) are handled to provide for the data flow of content to the devices 110A-N. Other protocols for provisioning data flow to the devices 110A-N by the load balancer 120 and/or servers 140A-N may also be used.

The load balancer 120 may be configured to manage network traffic to the GW instances or servers 140A-N. In some aspects, an "instance" may refer to a virtual server in a cloud network, such as, for example, servers 140A-N. In cloud deployment of servers 140A-N (e.g., security GW instances), the servers 140A-N may be front-ended by the load balancer 120, which is configured to distribute secure tunnel sessions from devices 110A-N across available servers 140A-N according to one or more distribution schemes. The distribution schemes may, for example, comprise a round-robin distribution, weighted distribution, random distribution, or a combination of load balancing distribution schemes. The distribution schemes may also define a minimal number of instances required for creating a group, and may also define network conditions requiring additional instances to be added to existing groups. Network conditions that may trigger additional instances may include, for example, CPU usage, memory utilization on current instances reaching certain threshold limits, or a number of tunnels or connections reaching certain threshold limits.

The network environment 100 includes a monitoring module 130 connected to the load balancer 120 and servers 140A-N. The network environment 100 may also include additional components, fewer components, or alternative components, such as additional service providers, additional servers, different networks for different devices, and/or additional third-party servers. The network environment 100 may include additional components, such as routers, firewalls, or servers. The load balancer 120 and/or the monitoring module 130 may be implemented as a single machine or distributed across a number of machines in the network, and may comprise one or more servers. In some embodiments, the monitoring module 130 may be implemented as a part or component of another entity such as the load balancer 120 or a network controller.

The network devices (e.g., devices 110A-N, load balancer 120, monitoring module 130, and servers 140A-N) may be connected over links through ports. Any number of ports and links may be used. The ports and links may use the same or different media for communications. Wireless, microwave, wired, Ethernet, digital subscriber lines (DSL), telephone lines, T1 lines, T3 lines, satellite, fiber optics, cable and/or other links may be used.

According to the subject technology disclosed herein, the monitoring module 130 may be configured to scale down or automatically shrink a number of servers 140A-N (e.g., security GW instances) in a cloud-based deployment during non-peak network traffic periods without impacting existing secure connections or tunnels from the devices 110A-N. The monitoring module 130 may be configured to request or detect a number of secure tunnels or connections to a GW instance or server 140A-N, CPU usage, bandwidth utilization, response time, memory utilization, and/or usage of other computing resources. For example, the monitoring module 130 may request from each server 140A-N a number of active connections or tunnels to devices 110A-N. If the number of connections or tunnels for a particular server 140A-N is equal to or less than a predetermined threshold, the monitoring module 130 may run a scaling down or automatic shrink routine, as discussed further below. In another example, the monitoring module 130 may request from each server 140A-N CPU usage, memory usage, and/or other computing resource usage. If CPU or resource usage for a particular server 140A-N is equal to or less than a predetermined threshold, the monitoring module 130 may run a scaling down or automatic shrink routine, as discussed further below.

In some aspects, a number of servers 140A-N (e.g., security GW instances) may be scaled down by transferring secure connections or tunnels to servers 140A-N having connections, tunnel sessions, CPU usage, bandwidth utilization, response time, memory utilization, and/or usage of other computing resources that exceed lower limits of predetermined thresholds (e.g., minimally loaded security GW instances), to other available servers 140A-N (e.g., security GW instances). In one aspect, transfer of secure connections or tunnels may be accomplished without impacting tunnel connectivity by initiating a rekey routine. A rekey routine may refer to a process of changing a session key (e.g., encryption key of an ongoing communication) in order to limit the amount of data encrypted with the same key. A rekey routine may be run after a pre-set volume of data has been transmitted, a given period of time has passed, and/or a command is issued to force new key exchange. For example, the monitoring module 130 may be configured to instruct servers 140A-N (e.g., minimally loaded security GW instances) to initiate a rekey routine to all connected devices 110A-N with secure connections or tunnel sessions. In response, servers 140A-N (e.g., minimally loaded security GW instances) may transmit rekey requests to the connected devices 140A-N. Responses from connected devices 110A-N to the rekey requests may be routed by the load balancer 120 to other available servers 140A-N (e.g., security GW instances) to establish a new secure connection or tunnel session with a different server 140A-N, and thereby replace all secure connections or tunnel sessions to minimally loaded security GW instances. In some aspects, the monitoring module 130 may be configured to instruct the load balancer 120 to route all responses to the rekey requests from devices 110A-N to one or more servers 140A-N, other than minimally loaded servers or security GW instances. After the new secure connections or tunnel sessions are established, the minimally loaded security GW instances may be disconnected from the network thereby scaling down the number of servers 140A-N on the network. In one aspect, by establishing new secure connections or tunnel sessions with other available servers 140A-N (e.g., security GW instances) before terminating the secure connections or tunnel sessions to the minimally loaded servers or security GW instances, transfer of secure connections or tunnel sessions may occur without affecting tunnel connectivity with devices 110A-N.

Figure 2:
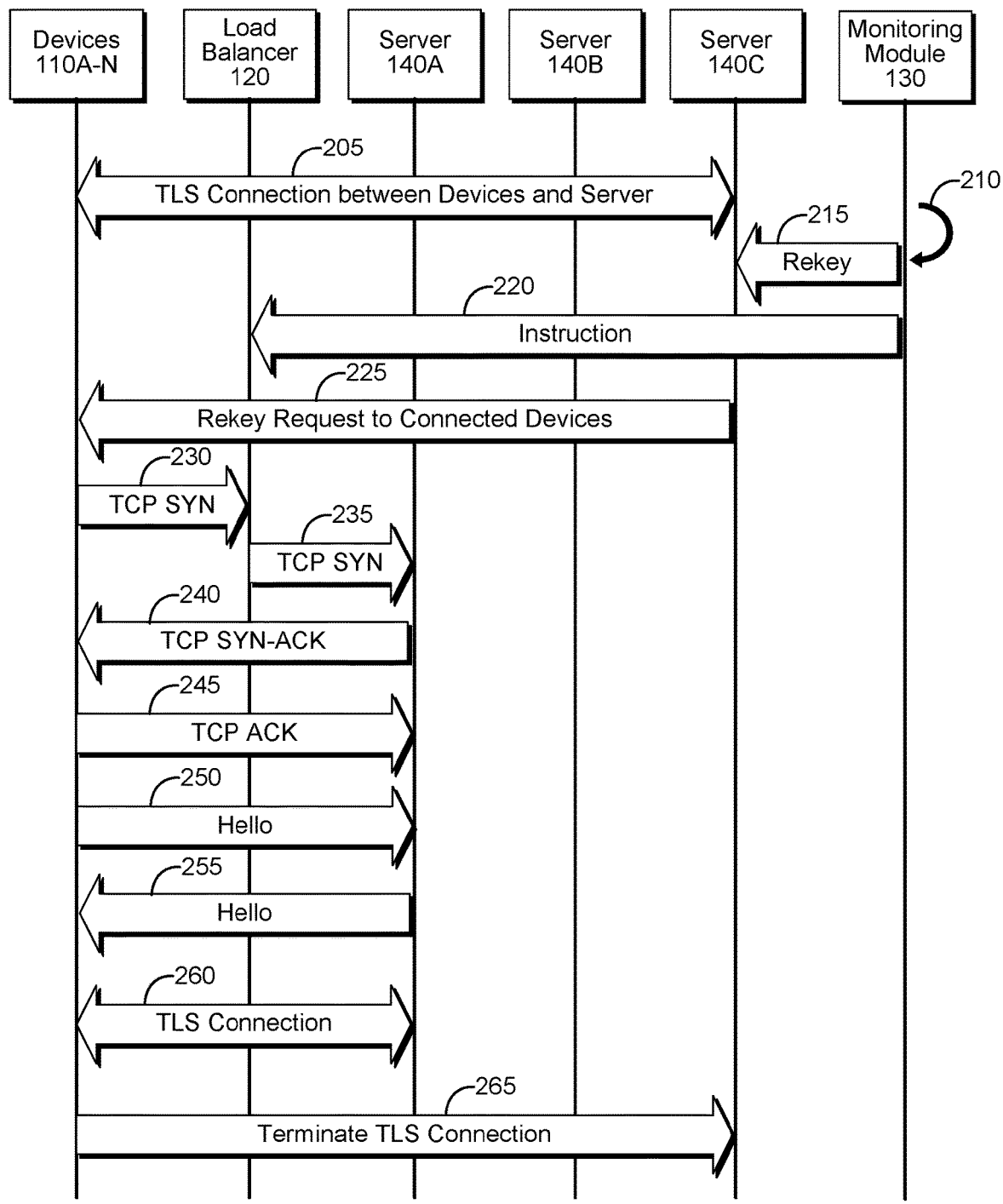
FIG. 2 depicts a sequence diagram showing the communications between devices, a load balancer, servers, and a monitoring module, in accordance with various aspects of the subject technology.

FIG. 2 depicts a sequence diagram 200 showing the communications between devices 110A-N, load balancer 120, servers 140A-C, and monitoring module 130, in accordance with various aspects of the subject technology. The sequence diagram of FIG. 2 is performed by the devices shown. Devices 110A-N perform acts 205, 230, 245, 250, 260 and 265. The load balancer 120 performs act 235. The server 140A performs acts 240, 255 and 260. The server 140C performs acts 205 and 225. The monitoring module performs acts 210, 215 and 220. Other devices may perform any one or more of the acts, such as a different server. Any of the acts may involve operations by more than one component, such as the determination that threshold limits are met in act 210 by the monitoring module 130, or instruction to not send new session requests to server 140C in act 220 by the monitoring module 130.

Additional, different, or fewer acts may be provided. For example, acts for any one of the devices (e.g., devices 110A-N, load balancer 120, server 140A-C, and monitoring module 130) are performed with or without the other devices performing acts. In yet another example, instruction transmission, rekey processes, routing, or other networking acts are performed in addition to the acts shown in FIG. 2. The acts may be performed in the order shown. The order is listed in numerical sequence and/or from top to bottom in FIG. 2. In alternative aspects, the acts may be performed in other orders.

In act 205, a secure connection or tunnel session (e.g., TLS, DTLS, or IPSEC) is established between each device 110A-N and the server 140C (e.g., security GW instance) to provide for the data flow of content to the devices 110A-N. The monitoring module 130 is configured to carry out policies for detecting network conditions for scaling down servers 140A-C (e.g., containers, virtual machines, security GW instances, etc.). For example, monitoring module 130 may be configured to monitor network metrics, such as number of secure tunnels or connections, CPU usage, bandwidth utilization, response time, memory utilization, and/or usage of other computing resources, and compare values of the metrics with predetermined thresholds to determine whether lower limits of the predetermined thresholds are met or exceeded. By way of example, the monitoring module 130 may be configured to monitor the number of connections or tunnel sessions to all of the security GW instances. In act 210, if the monitoring module 130 determines that the number of tunnel sessions to server 140C is equal to or less than a predetermined threshold (e.g., 10, 100 or 1,000 tunnel sessions), the monitoring module 130 runs a scaling down or auto-shrink routine to transfer all connections or tunnel sessions from server 140C (e.g., minimally loaded security GW instance) to other available servers (e.g., security GW instances), and thereby allow server 140C to be subsequently terminated without negatively affecting secure connections or tunnel sessions from devices 110A-N.

In act 215, the monitoring module 130 instructs the server 140C (e.g., minimally loaded security GW instance) to initiate a rekey request to all secure connections or tunnel sessions connected to the server 140C. In act 220, the monitoring module 130 instructs the load balancer 120 to not send any new secure tunnel session requests (e.g., TCP handshake) to server 140C. In some aspects, the monitoring module 130 may update data associated with the load balancer 120 to cause the load balancer 120 to forward any new secure tunnel session requests (e.g., TCP handshake) to available servers 140A, B (e.g., security GW instances), other than server 140C.

In act 225, in response to the instruction from the monitoring module 130 in act 215, the server 140C transmits a rekey request to all connected devices 110A-N to initiate, for example, a TCP handshake. In act 230, devices 110A-N connected to server 140C that received the rekey request in act 225, transmit a response to the rekey request to initiate a new secure connection (e.g., Security Association (SA)). The response to the rekey request is received by the load balancer 120 and in act 235, routed, distributed or assigned to other available security GW instances, such as server 140A, based on the instruction from the monitoring module in act 220. Devices 110A-N and server 140A may engage in a handshake to negotiate and establish a new secure connection or tunnel session (e.g., TCP handshake) between the devices 110A-N and the server 140A. For example, in act 230, the devices 110A-N may transmit a TCP SYN message that is routed, distributed or assigned to server 140A in act 235 by the load balancer 120. In response, in act 240, the server 140A may transmit a TCP SYN ACK message to the devices 110A-N. In response, in act 245, the devices 110A-N may transmit a TCP ACK message to the server 140A.

In act 250, the devices 110A-N may transmit a "Hello" message to the server 140A and in act 255, the server 140A may respond with a "Hello" message back to the devices 110A-N. In act 260, a secure connection or tunnel session (e.g., TLS, DTLS, or IPSEC) is established between each device 110A-N and the server 140A (e.g., security GW instance) to provide for the data flow of content to the devices 110A-N. In one aspect, the secure connection established in act 205 between each device 110A-N and server 140C remains active and provides the data flow of content to each respective device 110A-N until the new secure connection of act 260 is established with the respective device 110A-N. Once the new secure connection of act 260 is established between the respective device 110A-N and the server 140C, in act 265 the secure connection established in act 205 between the respective device 110A-N and the server 140C may be terminated. In one aspect, because the secure connections established in act 205 between the devices 110A-N and the server 140C are terminated after the new secure connections are established in act 260 between the devices 110A-N and the server 140C, data flow of content to the devices 110A-N is not negatively impacted.

In some aspects, the monitoring module 130 may be further configured to communicate with the server 140C to confirm that there are no active secure connections or tunnel sessions. Once confirmed, the monitoring module 130 may instruct the load balancer 120 to disconnect server 140C to scale down the number of servers 140A-C active in the cloud-based network.

In other aspects, acts 225-265 occur on all connections or tunnel sessions associated with server 140C and may result in transfer of all connections or tunnel sessions from server 140C to server 140A within a timeframe of a few minutes.

Figure 3:
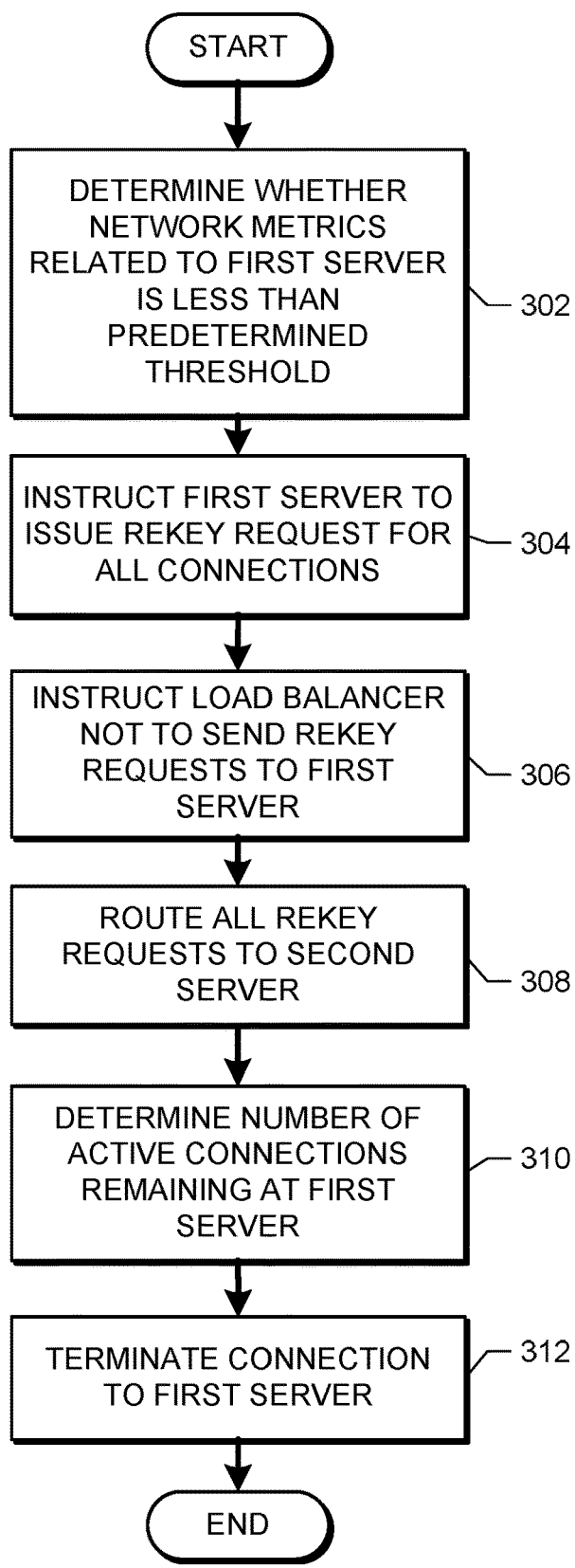
FIG. 3 depicts an example method for scaling down a resource in a network environment, in accordance with various aspects of the subject technology.

FIG. 3 shows an example method 300 for scaling down network resources in a cloud-based network environment. It should be understood that, for any process discussed herein, there can be additional, fewer, or alternative steps performed in similar or alternative orders, or in parallel, within the scope of the various aspects unless otherwise stated. The method 300 can be performed by a network (e.g., the network environment 100 of FIG. 1) or similar system. For example, the method 300 may be performed by monitoring module 130 of FIG. 1.

At operation 302, a determination is made by the monitoring module 130 of FIG. 1 regarding whether one or more network metrics associated with a first server (e.g. first security GW instance) equals or exceeds a predetermined threshold. In other aspects, the determination may be based on detected number of connections or tunnel sessions associated with the first server, CPU usage, bandwidth utilization, response time, memory utilization, and/or usage of other computing resources, as discussed above. If the detected number of connections or tunnel sessions associated with the first sever (e.g. first security GW instance) equals or exceeds the predetermined threshold, an automatic-shrink or scale down routine is commenced indicating that there is excess capacity of security GW instances in a cloud-based network as may be the case during off-peak hours where the network may experience less demand and traffic.

At operation 304, the monitoring module 130 of FIG. 1 instructs the first server to initiate or issue a rekey request or procedure for all connections associated with the first server. In response, the first server may issue a rekey request from the first server to a plurality of devices connected to the first server. In response, the plurality of devices connected to the first server and receiving data via a secure connection or tunnel session from the first server (e.g., first security GW instance), transmit a rekey request (e.g., TCP handshake) to a load balancer.

At operation 306, the monitoring module 130 of FIG. 1 instructs the load balancer 120 of FIG. 1 to not send any subsequent rekey requests (e.g., TCP handshakes) to the first server. In one aspect, the load balancer may be instructed to send, route, or otherwise distribute any subsequent rekey requests (e.g., TCP handshakes) to a second server (e.g., second security GW instance). The load balancer may be configured to manage, distribute, or assign rekey requests received from a plurality of devices to a plurality of servers, including the first server (e.g., first security GW instance) and the second server (e.g., second security GW instance).

At operation 308, rekey requests from the plurality of devices are routed by the load balancer 120 of FIG. 1 to the second server, according to the instruction received at operation 306.

The rekey request forwarded, routed, or otherwise assigned to the second server is received by the second server. A secure connection (e.g., TLS, DTLS, IPSEC) between the second server and each of the plurality of devices may then be established to provide data flow to each of the plurality of devices. After a connection is established between the second server and a respective device of the plurality of devices, the secure connection (e.g., TLS, DTLS, IPSEC) between the respective device and the first server may be terminated, thereby relying solely on the secure connection between the second server and the respective device to provide data flow to the respective device. After each device of the plurality of devices establishes a secure connection with the second server, the connection to the first server may be terminated by the load balancer 120.

At operation 310, the monitoring module 130 of FIG. 1 may be configured to ping or query the first server to obtain information relating to the number of active connections or tunnel sessions associated with the first server. If the monitoring module 130 determines that there are no active connections or tunnel sessions to the first server, the monitoring module 130 may instruct the load balancer 120 to terminate the first server. At operation 312, after all devices of the plurality of devices establish respective secure connections with the second server, the first server may be disconnected from the cloud-based network or otherwise terminated, thereby reducing the number of servers (e.g., security GW instances) on the network.

In some aspects, the method 300 provides a method for scaling down security GW instances without compromising or otherwise negatively impacting data flow to devices. Encrypted application data may flow through existing secure tunnel sessions until after new secure tunnel sessions are established. As such, transitioning encrypted data or traffic from existing tunnel sessions to newly established tunnel sessions is seamless and does not negatively affect any application or data flow.

Figure 4:
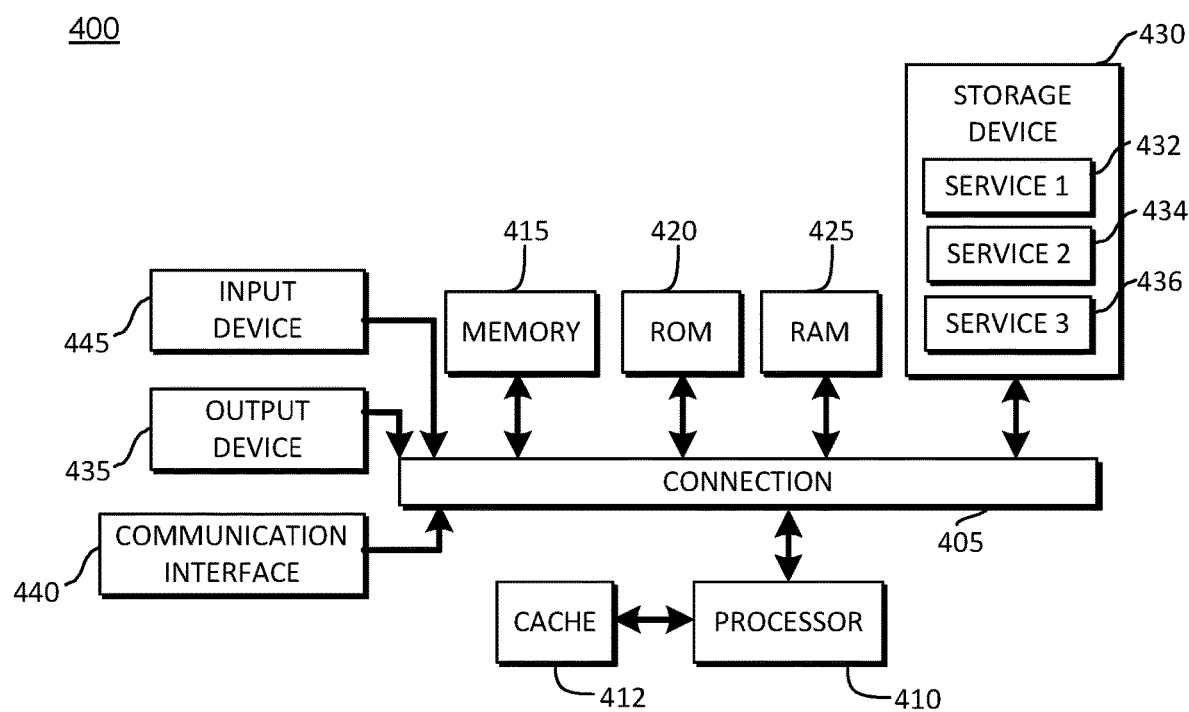
FIG. 4 illustrates an example of a system in accordance with some aspects.

FIG. 4 depicts an example of a computing system 400 in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

System 400 includes at least one processing unit (CPU or processor) 410 and connection 405 that couples various system components including system memory 415, such as read only memory (ROM) 420 and random access memory (RAM) 425 to processor 410. Computing system 400 can include a cache 412 of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

It will be appreciated that computing system 400 can have more than one processor 410, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
   detecting a reduction in one or more network metrics related to a first server;
   instructing the first server to issue a rekey request to a plurality of devices connected to the first server in response to the detected reduction in the one or more network metrics related to the first server, wherein the rekey request is part of a rekey routine for changing one or more session keys of an ongoing communication with the plurality of devices;
   instructing, in response to the detected reduction in the one or more network metrics, a load balancer to route responses from the plurality of devices to the rekey request to at least one other server to connect the plurality of devices to at least one of the at least one other server in response to the rekey request;
   determining a number of connections remaining between the first server and the plurality of devices; and
   instructing the load balancer to terminate the first server based on the determined number of connections remaining between the first server and the plurality of devices,
   wherein instructing the load balancer to route the responses from the plurality of devices to the at least one other server comprises instructing the load balancer to not send responses from the plurality of devices to the first server.

2. The computer-implemented method of claim 1, wherein the one or more network metrics comprises at least one of a number of connections to the first server, CPU usage of the first server, and memory utilization of the first server.

3. The computer-implemented method of claim 1, wherein the determining the number of connections remaining comprises transmitting a query to the first server to solicit a response indicating a number of active connections between the first server and the plurality of devices.

4. The computer-implemented method of claim 1, wherein the load balancer is instructed to terminate the first server when the determined number of connections remaining between the first server and the plurality of devices is zero.

5. The computer-implemented method of claim 1, wherein the connections comprise at least one of a TLS, DTLS, and IPSEC connection.

6. The computer-implemented method of claim 1, wherein the first server comprises a first security gateway instance, and wherein the second server comprises a second security gateway instance.

7. A non-transitory computer-readable medium comprising instructions, the instructions, when executed by a computing system, cause the computing system to:
- detect a reduction in one or more network metrics related to a first server;
- instruct the first server to issue a rekey request to a plurality of devices connected to the first server in response to the detected reduction in the one or more network metrics related to the first server, wherein the rekey request is part of a rekey routine for changing one or more session keys of an ongoing communication with the plurality of devices;
- instruct, in response to the detected reduction in the one or more network metrics, a load balancer to route responses from the plurality of devices to the rekey request to at least one other server to connect the plurality of devices to at least one of the at least one other server in response to the rekey request;
- determine a number of connections remaining between the first server and the plurality of devices; and
- instruct the load balancer to terminate the first server based on the determined number of connections remaining between the first server and the plurality of devices,
- wherein instructing the load balancer to route the responses from the plurality of devices to the at least one other server comprises instructing the load balancer to not send responses from the plurality of devices to the first server.

8. The non-transitory computer-readable medium of claim 7, wherein the one or more network metrics comprises at least one of a number of connections to the first server, CPU usage of the first server, and memory utilization of the first server.

9. The non-transitory computer-readable medium of claim 7, wherein the determining the number of connections remaining comprises transmitting a query to the first server to solicit a response indicating a number of active connections between the first server and the plurality of devices.

10. The non-transitory computer-readable medium of claim 7, wherein the load balancer is instructed to terminate the first server when the determined number of connections remaining between the first server and the plurality of devices is zero.

11. The non-transitory computer-readable medium of claim 7, wherein the connections comprise at least one of a TLS, DTLS, and IPSEC connection.

12. The non-transitory computer-readable medium of claim 7, wherein the first server comprises a first security gateway instance, and wherein the second server comprises a second security gateway instance.

13. A system comprising:
- a processor; and
- a non-transitory computer-readable medium storing instructions that, when executed by the system, cause the system to:
  - detect a reduction in one or more network metrics related to a first server;
  - instruct the first server to issue a rekey request to a plurality of devices connected to the first server in response to the detected reduction in the one or more network metrics related to the first server, wherein the rekey request is part of a rekey routine for changing one or more session keys of an ongoing communication with the plurality of devices;
  - instruct, in response to the detected reduction in the one or more network metrics, a load balancer to route responses from the plurality of devices to the rekey request to at least one other server to connect the plurality of devices to at least one of the at least one other server in response to the rekey request;
  - determine a number of connections remaining between the first server and the plurality of devices; and
  - instruct the load balancer to terminate the first server based on the determined number of connections remaining between the first server and the plurality of devices,
  - wherein instructing the load balancer to route the responses from the plurality of devices to the at least one other server comprises instructing the load balancer to not send responses from the plurality of devices to the first server.

14. The system of claim 13, wherein the one or more network metrics comprises at least one of a number of connections to the first server, CPU usage of the first server, and memory utilization of the first server.

15. The system of claim 13, wherein the determining the number of connections remaining comprises transmitting a query to the first server to solicit a response indicating a number of active connections between the first server and the plurality of devices.

16. The system of claim 13, wherein the connections comprise at least one of a TLS, DTLS, and IPSEC connection.

17. The system of claim 13, wherein the first server comprises a first security gateway instance, and wherein the second server comprises a second security gateway instance.

* * * * *